US007014905B1

(12) United States Patent
Linton

(10) Patent No.: US 7,014,905 B1
(45) Date of Patent: Mar. 21, 2006

(54) WEAR PAD

(75) Inventor: Vercel Ray Linton, 6819 Hwy 311, Sellersburg, IN (US) 47172

(73) Assignee: Vercel Ray Linton, Sellersburg, IN (US)

( * ) Notice: Subject to any disclaimer, the term of this patent is extended or adjusted under 35 U.S.C. 154(b) by 133 days.

(21) Appl. No.: 10/766,555

(22) Filed: Jan. 28, 2004

(51) Int. Cl.
*B32B 3/02* (2006.01)

(52) U.S. Cl. ........................ 428/99; 206/453; 206/586; 410/41; 410/99; 217/69

(58) Field of Classification Search .................. 428/99; 206/453, 586; 217/69; 410/99, 41
See application file for complete search history.

(56) References Cited

U.S. PATENT DOCUMENTS

| | | | | |
|---|---|---|---|---|
| 2,793,904 A | | 5/1957 | Gale | |
| 3,743,341 A | | 7/1973 | Gale | |
| 4,011,632 A | | 3/1977 | MacDonald | |
| 4,842,914 A | | 6/1989 | Franke | |
| 4,877,673 A | * | 10/1989 | Eckel et al. | 428/172 |
| 5,098,143 A | * | 3/1992 | Hill | 294/74 |
| 5,114,010 A | | 5/1992 | Smith | |
| 6,611,995 B1 | * | 9/2003 | Jackson et al. | 24/298 |

* cited by examiner

*Primary Examiner*—Alexander S. Thomas
(74) *Attorney, Agent, or Firm*—Scott R. Cox

(57) ABSTRACT

A wear pad for insertion between a load to be lifted and a lifting device, such as a chain or wire cable of a crane, hoist or other lifting device, containing a cylindrical-shaped edge protector with a cut out section and raised edges on the outside surface of each cylindrical end of the edge protector, which edges extend around the circumference of the edge protector. The wear pad may further include an attachment element for attaching the edge protector to the load being lifted by the lifting device, such as a magnet.

17 Claims, 5 Drawing Sheets

WEAR PAD

BACKGROUND OF INVENTION

The invention relates to a specially-designed wear pad for insertion between a load to be lifted and the strap, band, rope, wire cable, or chain of a lifting device for protecting both the load and the chain, wire cable, rope, band or strap used for lifting from damage while the load is being lifted. This wear pad includes a generally cylindrically shaped edge protector with a cut out section, which edge protection contains raised edges on the outside surface thereof at each end of the wear pad. The wear pad is designed to be attached to the load to be lifted and remains with the load during the lifting procedure.

Edge protectors for insertion between a load to be lifted and a lifting element, such as a chain or wire cable of a crane, hoist or other lifting device, are well-known in the art, as shown for example in U.S. Pat. Nos. 2,793,904, 3,747,341, 4,011,632 and 5,114,101.

In addition, devices specially-designed to protect the chain or wire cable of a lifting device from abrasion during a load lifting operation are disclosed by U.S. Pat. Nos. 2,793,904 and 4,842,914.

A particular design for a c-shaped attachment device, (18) for use with a cable for attaching to and raising long, heavy structural beams is disclosed in U.S. Pat. No. 5,098,143. The device which is used to hold the sling assembly of the lifting device, is a c-shaped attachment device (11) containing a pair of bolts (19, 20), which are designed to be tightened to attach to the load being lifted, such as a steel plate.

U.S. Pat. No. 4,842,914 discloses an edge protector (1) for use with a load to be lifted by a lifting device, which comprises a first and second angle arms (5, 6) having interior faces (7) for placement against the load and outer faces (8) which form a continuous c-shaped surface having a guide groove (10) attached to that c-shaped surface for accommodating the wire or chain of the lifting device.

While these devices are useful to assist in the lifting of loads by means of a cable or other lifting device, improvements in such edge protectors are still necessary.

Accordingly, it is an object in the invention to provided an improved wear pad containing a generally cylindrical-shaped edge protector with a cut out section and raised edges on the outside surface of each end of the edge protector.

It is further object of the invention to disclose a wear pad for insertion between a load to be lifted and a lifting device comprising a cylindrical-shaped edge protector with a cut out section containing an attachment element for attaching the edge protector to the load being lifted by the lifting device.

These and other objects can be obtained by the wear pad which is disclosed in the following specification taken in connection with the accompanying drawings.

SUMMARY OF THE INVENTION

The present invention is a wear pad (10) for insertion between a load to be lifted and a chain or wire cable of a crane, hoist or other lifting device, comprising a cylindrical-shaped edge protector (20) with a cut out section, which has been removed, containing raised edges (28, 30) on the outside surface (36) of the edge protector located at each end (24, 26) of the edge protector, which raised edges (28, 30) preferably extend around the circumference of the edge protector (20).

Preferably, the wear pad further comprises a slot (32) cut into the center of the cylindrical edge protector extending from one end (24) to the other end (26) of the wear pad (20).

A preferred embodiment of the invention includes an attachment element, secured to an inner surface (22) of the cut out section of the wear protector (20), for attaching the edge protector to the load being lifted by the lifting device, whereby this attachment element preferably comprises a magnet (34).

DETAIL DESCRIPTION OF A PREFERRED EMBODIMENT

Figure 1:
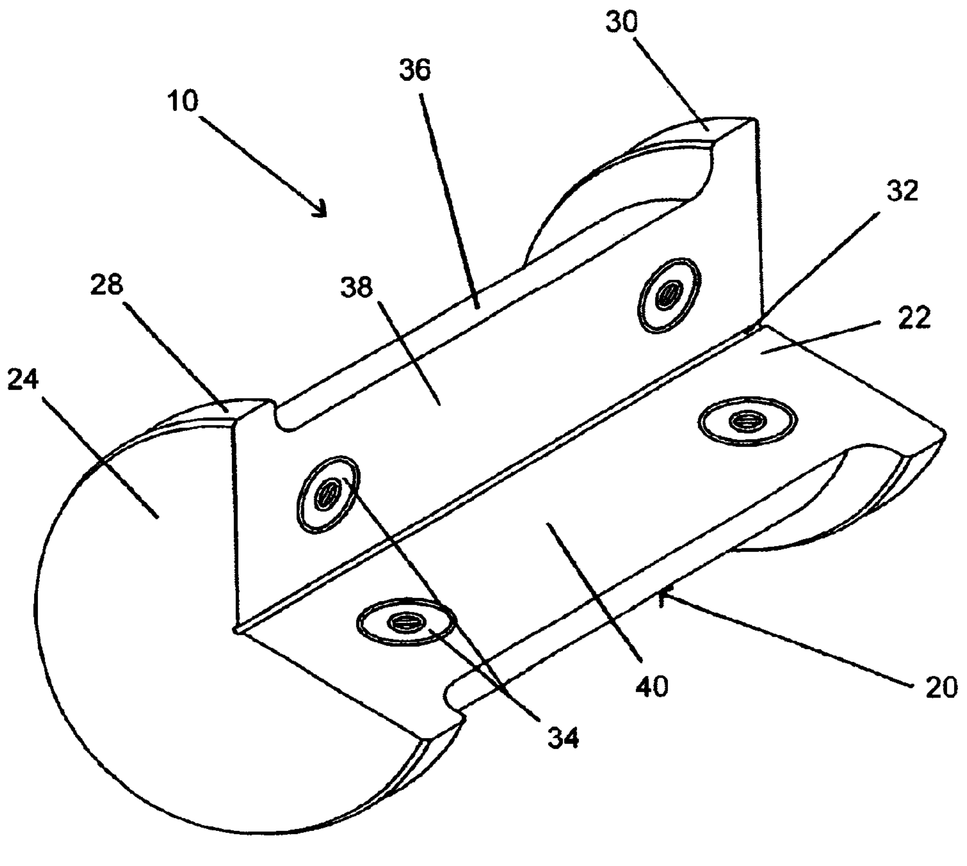
FIG. 1 is a perspective view of one embodiment of the wear pad.
Figure 2:
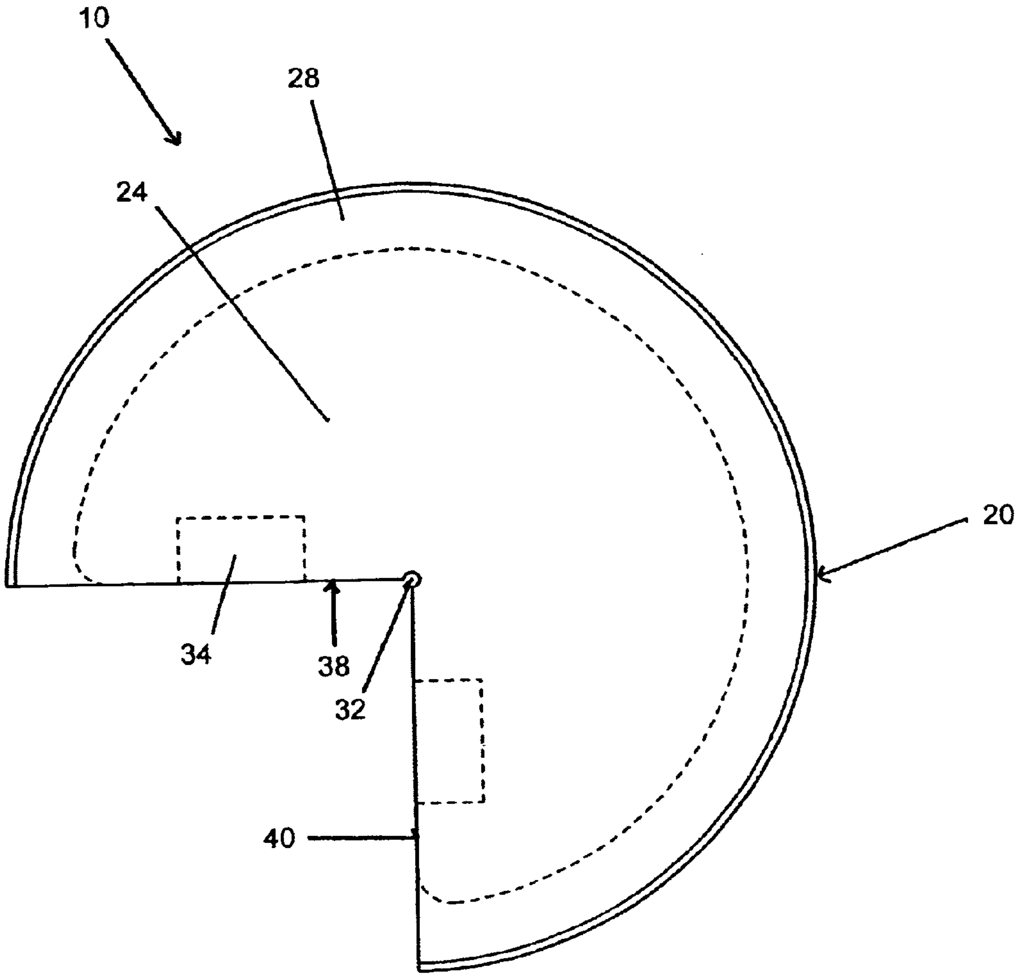
FIG. 2 is an end view of the wear pad of FIG. 1.

Referring more particularly to the drawings, the present invention comprises a wear pad (10) which is preferably formed as a generally cylindrical-shaped, edge protector (20) containing a cut out section removed from the cylindrical shape, as shown in FIGS. 1 and 2, and first and second ends (24, 26), each of which contains an outwardly extending raised edge (28, 30) on the outside surface (36) of the edge protector (20). Preferably a slot (32) is cut into the inside surface (22) of the cut out section, which extends from one end (24) of the edge protector (20) to the other end (26) of the edge protector (20), preferably in the center of the cylindrical-shaped edge protector (20) as shown in FIGS. 1 and 2. Preferably an attachment element, such as a magnet (34), is secured to, or contained within, the inner surface (22) of the cylindrical-shaped edge protector (20), preferably on or near the inside surface (22) of the cut out section.

The generally cylindrical shape of the wear pad can be formed in any size which will be useful as a wear pad for insertion between a load to be lifted and the chain or wire cable of a crane, hoist or other lifting device. The diameter of the generally cylindrical-shaped edge protector can be from about 2 inches to about 2 feet or more. The angle of the arc of the inside surface (22) of this cut out section depends on its use. Preferably the angle of the arc ranges from about 45° to about 270°, preferably from about 45° to about 120°, and most preferably from about 60° to about 120°, as shown in FIG. 2.

When the inside surface (22) of the cut out section is placed against the load, the chain or wire cable of the crane, hoist or other lifting device contacts the outside surface (36) of the cylindrical-shaped edge protector (20). This prevents the load from being damaged by contact with the chain or wire cable of the lifting device.

Figure 3:
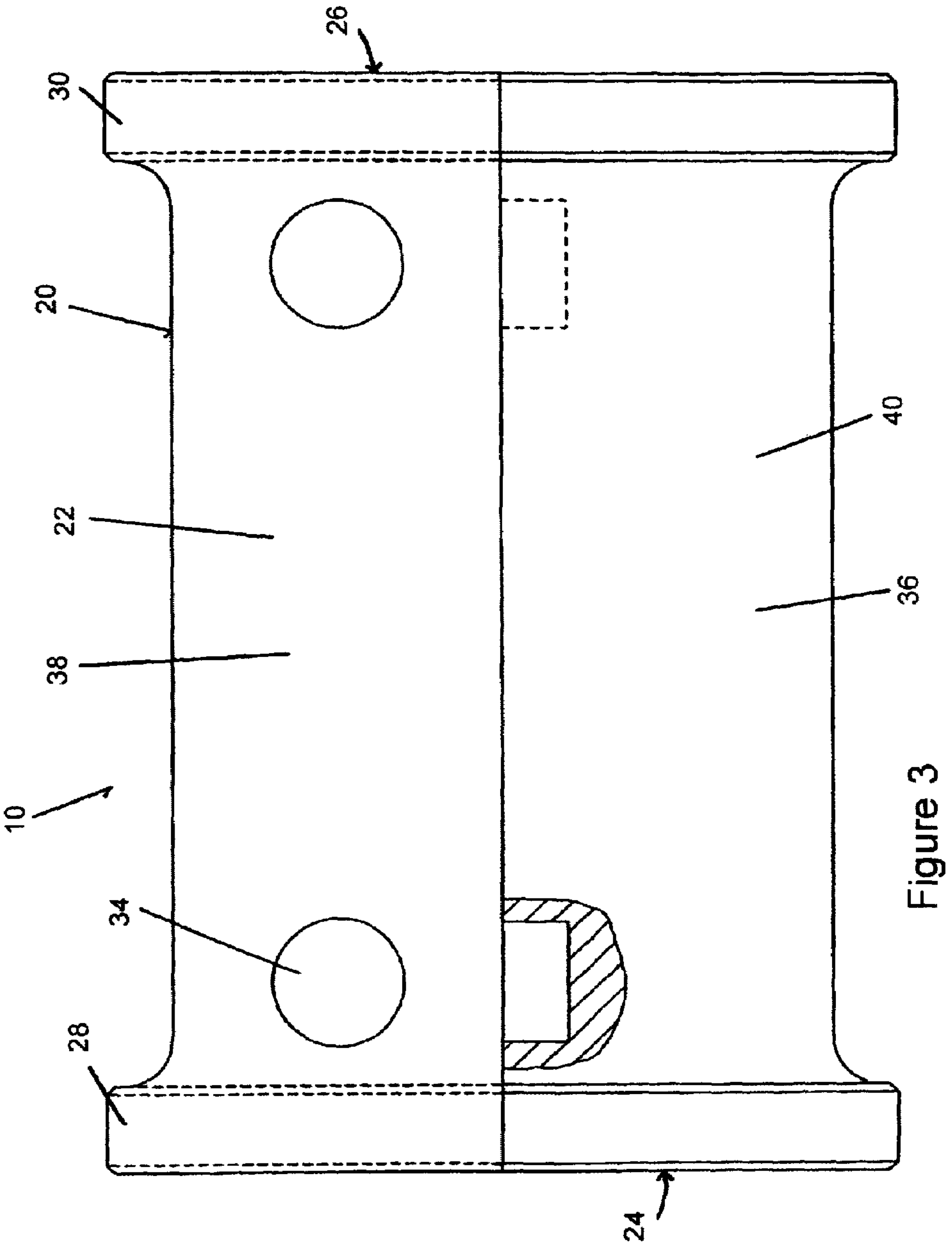
FIG. 3 is a side view of the wear pad of FIG. 1.

The ends (24, 26) of the cylindrical-shaped edge protectors (20) are preferably from about 1 inch to about 4 inches greater in diameter than the remaining diameter of the edge protector (20) as shown in FIGS. 1 and 3 and extend outwardly from the outside surface (36) of the cylindrical shaped edge protector (20) at least about ½ to about 2 inches. These ends (24, 26) of the cylindrical-shaped edge protectors preferably extend outwardly a distance equal to or greater than a substantial portion of the diameter of the chain or wire cable of the lifting device. This structure, of the wear pad (10), whereby the raised edges (28, 30) of the ends (24, 26) extend outward from its outside surface (36), limits or prevents damage to the chain or wire cable in case the load impacts an object, such as a wall or column.

The cylindrical-shaped edge protector (20) preferably contains a slot (32) running down the center of the edge protector (20) at the point where the arms (38, 40) of the inside surface of the cut out section (22) meet as shown in FIG. 1. One of the primary purposes of this slot (32) is to relieve stress on the edge protector (20) when in use. This slot (32) can be of any size and shape that accomplish this purpose. In one preferred embodiment this slot (32) is circular in cross section and extends from one end (24) to the opposite end (26) of the edge protector as shown in FIGS. 1 and 2. Its diameter can vary from 0.25 inch or more, as needed.

In a preferred embodiment an attachment element is secured inside the inside surface (22) of the cut out section to attach the edge protector (20) to the load being lifted. In one preferred embodiment this attachment element is a plurality of magnets (34), which are embedded into the surface (22) of the cut out section as shown in FIG. 1. Two or more magnets may be embedded in each arm (38, 40) of the edge protector (20), as desired. Other alternative attachments elements may also be used, such as hook and loop fasteners, or a bolt mechanism or other conventional attachment methods, as are known in the industry.

Figure 4:
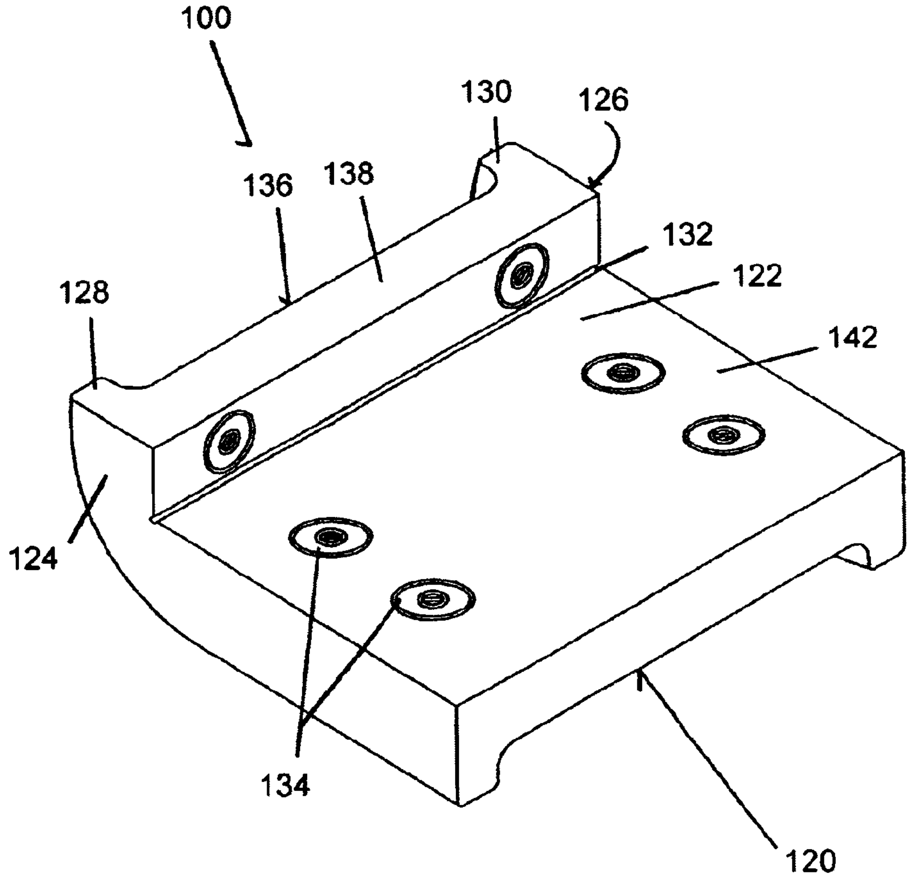
FIG. 4 is a perspective view of a second embodiment of the wear pad.

In one embodiment of the invention each arm (38, 40) of the cylindrical shaped edge protector is approximately the same width, i.e. preferably from about 1–4 inches in width as shown in FIGS. 1 and 2. In an alternative embodiment, as shown in FIG. 4, one arm (142) is substantially longer than the other arm (138). By use of the extended length arm (142), the edge protector (120) of the alternative embodiment can be placed under a load and retain contact with that load even if the load is not stacked completely level. For example, if different sheets of metal are stacked in a load and the edges of those sheets do not line up properly, this embodiment of the invention with a longer arm (142) is helpful in supporting the load.

Figure 5:
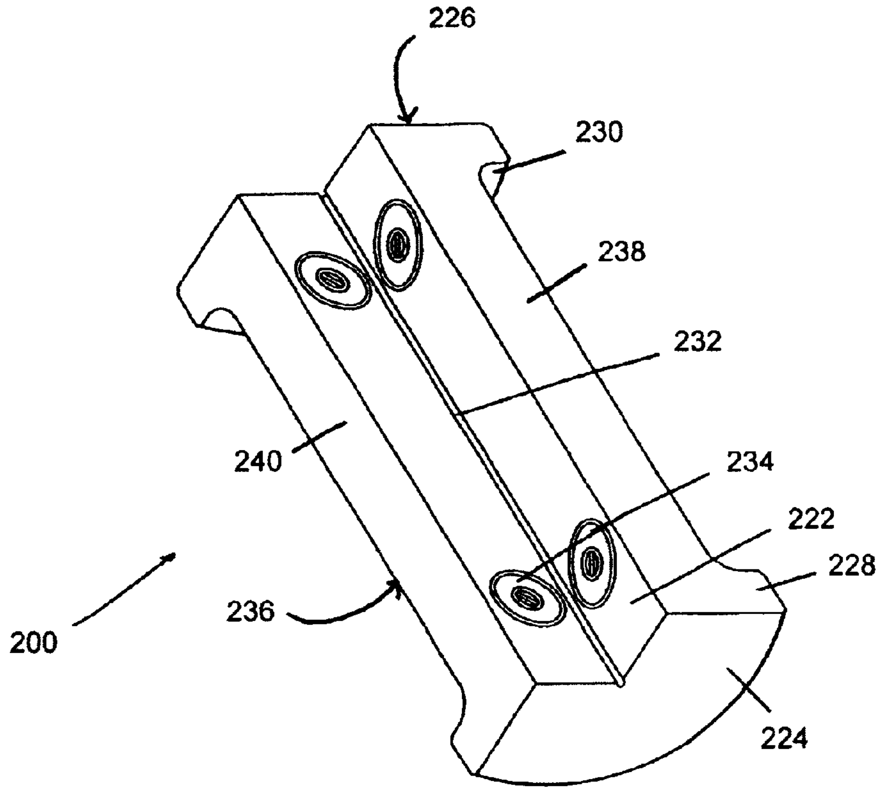
FIG. 5 is a perspective view of a third embodiment of the wear pad.

In another preferred embodiment of the invention as shown in FIG. 5, the outside surface (236) of the edge protector (220) only extends through an arch of about 45 to about 120°, preferable from about 60 to about 120°. In this embodiment the inside surface (222) is preferable formed in a perpendicular cross-section and acts as the support for the load. The outside raised edges (228, 230) of this edge protector (220) are preferably from about 1 inch to about 5 inches in width to provide support for the load. This embodiment uses less material than the first embodiment (10) and thus is lighter and less expensive to manufacture.

The edge protectors (20, 120, 220) are preferable formed from a high quality, durable plastic material, such as polypropylene. Preferably the product is injection molded in the desired shape.

In operation, the inside surface (22) of the cut out section of the cylindrical shaped edge protector (20), or the inside surface (122, 222) of the alternative embodiments' edge protectors (120, 220), are placed against the load. Preferably, the edge protector (20, 120, 220) is held in place against the load by attachment elements, such as magnets (34, 134, 234). The lifting elements, such as a chain or wire cable of a crane, hoist or other lifting device, is then placed against the outside surface (36, 136, 236) of the edge protector (20, 120, 220) and tightly secured in position. The raised outside edges (28, 30, 128, 130, 228, 230) located at each end of the edge protector (20, 120, 220) prevent the chain or wire from sliding off of the edge protector (20, 120, 220) and also protect the chain or wire from abrasion during the load lifting operation. Once the load has been lifted to the particular desired location and the pressure is taken off of the chain or wire cable, the edge protector (20, 120, 220) can be removed and reused.

It will be apparent from the foregoing that while a particular form of the invention has been illustrated and described, various modifications can be made without departing from the scope of the invention.

The invention claimed is:

1. A wear pad for insertion between a load to be lifted and a lifting device, comprising a cylindrical shaped edge protector containing raised edges at each cylindrical end of the edge protector, which raised edges extend substantially around the circumference of the edge protector and are extended outward from an outside surface of the edge protector at least about 0.5 inch, wherein a cut out section has been removed from the cylindrical-shaped edge protector, wherein said cut out section extends from one end to the opposite end of the cylindrical edge protector, wherein the cut out section comprises a wedge shaped piece cut out, and wherein the angle of the arc of the cut out section is from about 45 to about 270 degrees.

2. The wear protector of claim 1 further comprising a slot cut into a center of the cylindrical edge protector extending substantially from one end to the other end of the edge protector.

3. The wear protector of claim 1 further comprising an attachment element for attaching the load being lifted by the lifting device to an inside surface of the cut out section of the wear protector.

4. The wear pad of claim 3, wherein the attachment element comprises one or more magnets secured to or within the inside surface of the cut out section.

5. The wear pad of claim 1, wherein the edge protector is comprised of an injection molded, plastic material.

6. The wear pad of claim 5, wherein the injection molded edge protector is comprised of polypropylene.

7. The wear pad of claim 1, wherein the angle of the arc of the cut out section is from about 45 degrees to about 120 degrees.

8. The wear pad of claim 1, wherein one arm of the wear protector is wider than a second arm.

9. A wear pad for insertion between a load to be lifted and a lifting device, comprising a cylindrical-shaped edge protector containing raised edges at each cylindrical end of the edge protector, which raised edges extend substantially around the circumference of the edge protector and are extended outward from an outside surface of the edge protector at least about 0.5 inch, wherein a cut out section has been removed from the cylindrical shaped edge protector to form two arms of an inside surface of the edges protector, wherein said cut out section extends from one end to the opposite end of the cylindrical edge protector, and wherein the cut out section comprises a wedge shaped piece cut out, wherein the angle of the arc of the cut out section is from about 45 to about 270 degrees, a slot cut into a center of the inside surface of the cylindrical edge portion.

10. The wear pad of claim 9, wherein the edge protector is comprised of injection molded polypropylene.

11. The wear pad of claim 9, wherein one arm of the edge protector is wider than a second arm.

12. The wear pad of claim 10, wherein the angle of the arc of the cut out section is from about 45 degrees to about 120 degrees.

13. The wear pad of claim 12, wherein one arm of the edge protector is wider than a second arm.

14. A wear pad for insertion between a load to be lifted and a lifting device, comprising a cylindrical-shaped edge protector containing raised edges at each cylindrical end of the edge protector, which raised edges extend around the circumference of the edge protector and are extended outward from an outside surface of the edge protector at least about 0.5 inch, wherein a cut out section has been removed from the cylindrical shaped edge protector, wherein said cut out section extends from one end to the opposite end of the cylindrical edge protector, wherein the outside surface of the edge protector extends through an arc of about 45 to about 120°, and an attachment element secured to an inside surface of the cut out section of the edge protector for attaching the edge protector to the load being lifted by the lifting device.

15. The wear pad of claim 14, wherein the attachment element comprises one or more magnets secured within the inside surface of the edge protector.

16. The wear pad of claim 14, wherein the edge protector is comprised of injection molded, plastic.

17. The wear pad of claim 16, wherein the injection molded edge protector is comprised of polypropylene.

* * * * *